(12) United States Patent
Ragucci

(10) Patent No.: US 11,367,211 B2
(45) Date of Patent: Jun. 21, 2022

(54) INERTIALLY-ASSISTED TARGET DETECTION

(71) Applicant: Raytheon Company, Waltham, MA (US)

(72) Inventor: Anthony J. Ragucci, Waltham, MA (US)

(73) Assignee: Raytheon Company, Waltham, MA (US)

( * ) Notice: Subject to any disclaimer, the term of this patent is extended or adjusted under 35 U.S.C. 154(b) by 409 days.

(21) Appl. No.: 16/524,688

(22) Filed: Jul. 29, 2019

(65) Prior Publication Data

US 2021/0035321 A1 Feb. 4, 2021

(51) Int. Cl.
*G06T 7/70* (2017.01)
*G01C 21/16* (2006.01)
(Continued)

(52) U.S. Cl.
CPC .............. *G06T 7/70* (2017.01); *G01C 21/165* (2013.01); *G01S 3/786* (2013.01); *G06V 10/255* (2022.01);
(Continued)

(58) Field of Classification Search
CPC .............. G06T 7/70; G06T 2207/10048; G06T 2207/10016; G06T 7/246; G06T 7/73;
(Continued)

(56) References Cited

U.S. PATENT DOCUMENTS

| 5,128,874 A | 7/1992 | Bhanu et al. |
| 6,374,047 B1 * | 4/2002 | Beran ................. G01C 11/025 |
| | | 348/146 |

(Continued)

FOREIGN PATENT DOCUMENTS

| CN | 106774303 | * | 4/2019 |
| EP | 3361446 A1 | | 8/2018 |
| WO | 9928759 A1 | | 6/1999 |

OTHER PUBLICATIONS

Jin-Wen Tian et al., "Novel Method on Dual-Band Infrared Image Fusion for Dim Small Target Detection," Optical Engineering, vol. 46, No. 11, Nov. 1, 2007, pp. 116402-1-116402-8, XP055167323.

(Continued)

*Primary Examiner* — Jerome Grant, II
(74) *Attorney, Agent, or Firm* — Burns & Levinson LLP; Joseph M. Maraia

(57) ABSTRACT

A target detection system includes an imager that sequentially captures frames, in different emission bands. These frames are registered with respect to one another based on information from an Inertial Navigation System (INS) and compensation is made for any motion of the imager between frames. Identification of a candidate target object that is detected, or otherwise identified in one band, initiates a search for a correlated object in the other band within a radius, or distance, in a common image-space reference frame. When a pair of objects is identified, a measure of the intensities of the signals in the two bands is compared to an expected range of values to discriminate a target of interest from an object that is not of interest.

17 Claims, 6 Drawing Sheets

(51) Int. Cl.
 *G01S 3/786* (2006.01)
 *H04N 5/33* (2006.01)
 *G06V 10/20* (2022.01)
(52) U.S. Cl.
 CPC ... *H04N 5/332* (2013.01); *G06T 2207/10048* (2013.01)
(58) Field of Classification Search
 CPC ............ G06T 7/30; G06T 2207/10036; G01C 21/165; G01S 3/786; G06K 9/3241; H04N 5/332
 USPC ........................................................ 382/103
 See application file for complete search history.

(56) References Cited

U.S. PATENT DOCUMENTS

| | | | |
|---|---|---|---|
| 6,658,207 B1 * | 12/2003 | Partynski | G01C 11/025 348/144 |
| 7,483,551 B2 | 1/2009 | Chen | |
| 8,218,012 B2 | 7/2012 | DeFlumere et al. | |
| 8,373,127 B2 | 2/2013 | Ragucci et al. | |
| 9,129,181 B1 * | 9/2015 | Nathan | G06K 9/3241 |
| 2008/0198231 A1 * | 8/2008 | Ozdemir | G08B 25/009 348/159 |
| 2011/0261193 A1 * | 10/2011 | Agurok | G01J 5/60 348/135 |
| 2014/0118514 A1 * | 5/2014 | Wright | H04N 5/332 348/61 |
| 2017/0219693 A1 * | 8/2017 | Choiniere | H04N 5/332 |
| 2017/0285178 A1 * | 10/2017 | Platzer | G01S 5/0263 |
| 2019/0208111 A1 * | 7/2019 | Wendel | H04N 5/238 |
| 2019/0208129 A1 * | 7/2019 | Liu | H04N 5/23299 |
| 2019/0304105 A1 * | 10/2019 | Gao | G06K 9/4642 |
| 2019/0391254 A1 * | 12/2019 | Asghar | H04N 5/232 |

OTHER PUBLICATIONS

Steiner et al., "Fast Motion Estimation for Field Sequential Imaging: Survey and Benchmark," Image and Vision Computer, Elsevier, Guildford, GB, vol. 89, Jul. 25, 2019, pp. 170-182, XP085809153.
International Search Report and Written Opinion from related PCT Application No. PCT/US2020/024602 dated Jun. 23, 2020.

* cited by examiner

INERTIALLY-ASSISTED TARGET DETECTION

BACKGROUND

Known multispectral, i.e., two-color, staring-array imagers sequentially generate image frames for each spectral channel or band. As a result, there is a time delay, or difference, between the respective moments or times when any two or more sequential images are captured, even when collected in global shutter or snapshot mode. During the time between image capture events, something in the imaged scene may have changed, e.g., moved, or the imager itself, i.e., an imaging device, may have moved.

It is known that image processing techniques use a correlation between multiple spectral channels to identify objects or events of interest. These processing techniques include Hostile Fire Indicator (HFI) and Infrared Search and Track (IRST) algorithms. When, however, an object has moved, or an event has occurred, in the imager field during the time between frames the object may no longer be registered across the multiple frames, frustrating detection.

One method to mitigate this issue uses multiple imagers simultaneously and registers the images based on geometric constraints from the relative positions of the imagers. Separate imagers, however, necessitate more weight on a vehicle carrying the imagers than would otherwise be required. Another known approach uses an imager that can capture multiple channels simultaneously, though this usually comes at a cost of reduced resolution or sensitivity for either or both channels.

What is needed is a better approach to two-color, staring-array imaging for identifying objects of interest.

BRIEF SUMMARY OF THE INVENTION

In one aspect of the present disclosure there is provided a method of detecting a first type of target having a corresponding set of known properties, comprising: capturing, with an imager, a first image frame that includes first image frame data at a first image capture time, where the first image frame comprises at least one first image object; obtaining, with an inertial navigation system associated with the imager, first location data identifying a first location of the imager at the first image capture time; capturing, with the imager, a second image frame that includes second image frame data at a second image capture time subsequent to the first image capture time, where the second image frame comprises at least one second image object; obtaining, with the inertial navigation system, second location data identifying a second location of the imager at the second image capture time; generating combined image frame data from the first and second image frame data by compensating for imager movement between the first and second image capture times as a function of the first and second location data; and identifying a target of the first type in the combined image frame data as a function of the set of known properties.

The set of known properties comprises: a maximum velocity at which the first type of target can travel; a first band of radiated energy that is emitted by the first type of target; a second band of radiated energy that is emitted by the first type of target, and that does not overlap with the first band of radiated energy; and a characteristic ratio of the respective intensities of signals in the first and second bands of radiated energy, where the characteristic ratio is in a predetermined range of values.

In one aspect of the present disclosure, the imager is a single focal plane, channel-sequential multispectral imager, and the method further comprises: capturing the first image frame data in the first band of radiated energy; and capturing the second image frame data in the second band of radiated energy.

In another aspect of the present disclosure, identifying a target of the first type in the combined image frame data further comprises: defining a respective travel radius for each first and second image object in the combined image frame data as a function of the first and second image capture times, the first and second location data and the maximum velocity value; identifying each pair of first and second image objects with intersecting travel radii. Then, for each identified pair of first and second image objects with intersecting travel radii: generating a ratio (R1:R2) of an intensity value R1 of the first image object to an intensity value R2 of the second object image; and if the generated ratio is within a predetermined range of values, identifying the respective pair of first and second image objects as representative of a target of the first type.

In another aspect of the present disclosure, there is a target detection system for detecting a first type of target having a corresponding set of known properties, comprising: an imager configured to capture a first image frame that includes first image frame data at a first image capture time, where the first image frame comprises at least one first image object and configured to capture a second image frame that includes second image frame data at a second image capture time subsequent to the first image capture time, where the second image frame comprises at least one second image object; an inertial navigation system coupled to the imager and configured to provide first location data identifying a first location of the imager at the first image capture time and configured to provide second location data identifying a second location of the imager at the second image capture time. An image processor coupled to the imager and the inertial navigation system is configured to: generate combined image frame data from the first and second image frame data by compensating for imager movement between the first and second image capture times as a function of the first and second location data; and identify a target of the first type in the combined image frame data as a function of the set of known properties.

In yet another aspect of the present disclosure, there is a tangible computer-readable medium storing instructions thereon that, when executed by an image processor within a system comprising the image processor, an imager and an inertial navigation system, causes the image processor to implement a method of detecting a first type of target having a corresponding set of known properties. The method comprises: receiving, from the imager, first image frame data from a first image frame captured at a first image capture time, where the first image frame comprises at least one first image object; receiving, from the imager, second image frame data from a second image frame captured at a second image capture time subsequent to the first image capture time, where the second image frame comprises at least one second image object; receiving, from the inertial navigation system, first location data identifying a first location of the imager at the first image capture time and second location of the imager at the second image capture time; generating combined image frame data from the first and second image frame data by compensating for imager movement between the first and second image capture times as a function of the first and second location data; and identifying a target of the first type in the combined image frame data as a function of the set of known properties.

BRIEF DESCRIPTION OF THE DRAWINGS

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The figures are provided for the purposes of illustration and explanation and are not intended as a definition of the limits of the disclosure. In the figures.

DETAILED DESCRIPTION

Figure 1:
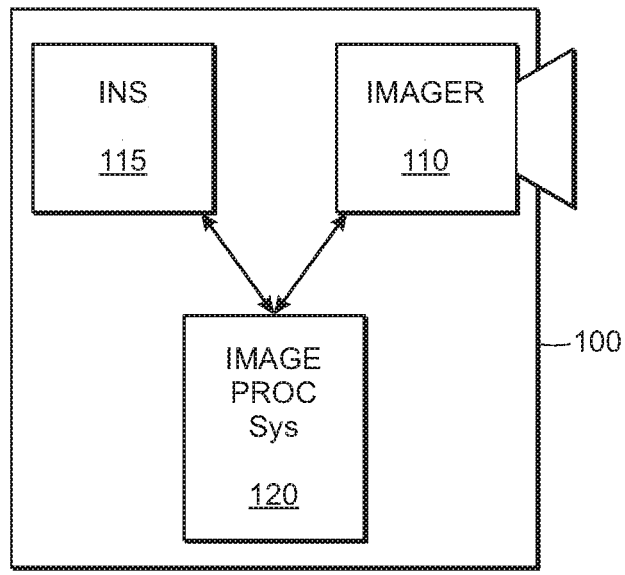
FIG. 1 is a target detection system in accordance with an aspect of the present disclosure.

In the following detailed description, numerous specific details are set forth in order to provide a thorough understanding of the aspects of the present disclosure. It will be understood by those of ordinary skill in the art that these embodiments may be practiced without some of these specific details. In other instances, well-known methods, procedures, components and structures may not have been described in detail so as not to obscure the details of the present disclosure.

Prior to explaining at least one embodiment of the present disclosure in detail, it is to be understood that the disclosure is not limited in its application to the details of construction and the arrangement of the components set forth in the following description or illustrated in the drawings. Also, it is to be understood that the phraseology and terminology employed herein are for the purpose of description only and should not be regarded as limiting.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

As an overview of an aspect of the present disclosure, an imager sequentially captures frames, in different channels or bands. These frames are registered with respect to one another based on information from an Inertial Navigation System (INS) or other inertial sensor co-located with the imager. Accordingly, any rotational motion and/or other motion of the imager between frames is compensated for. Although the individual frames are still separated in time, shifts in scene position can be compensated either partially or, for scenes much farther away than the distance the imager traversed between frames, almost entirely. In addition, image processing detection techniques can compensate for target motion as well.

Identification of a candidate target object that is detected, or otherwise identified in one channel, initiates a search for a correlated object in the second channel within a radius, or distance, in a common image-space reference frame. In one aspect of the present disclosure, as will be discussed in more detail below, the radius of correlation search is a function of anticipated, i.e., known, target motion and a predetermined level of detection specificity, i.e., an acceptable false alarm rate.

A target detection system (TDS) 100, as shown in FIG. 1, includes an imager 110 such as a single focal plane, channel-sequential multispectral imager, e.g., a two-color, staring-array imager; an Inertial Navigation System (INS) 115 and an image processing system (IPS) 120. As is known, an INS incorporates motion sensors and rotation sensors to continuously calculate, by dead reckoning, the position, the orientation and the velocity of a moving object without the need for external references. The INS 115 is tightly physically coupled to the imager 110 to track its position, velocity, orientation, etc. The IPS 120 is operatively coupled to the INS 115 and the imager 110.

Figure 2:
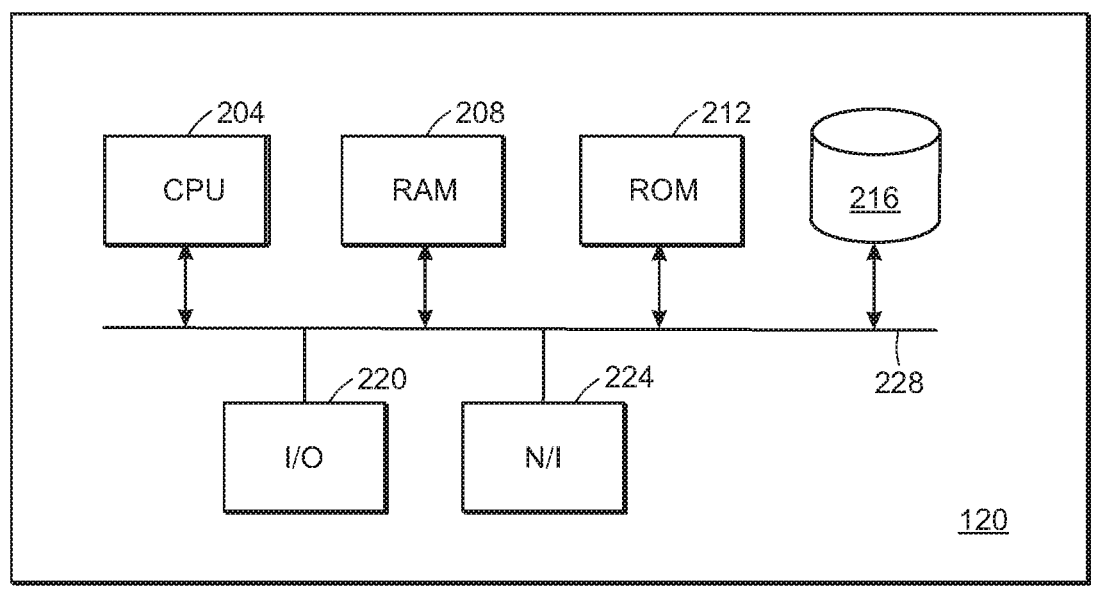
FIG. 2 is an image processing system component of the target detection system of FIG. 1.

Referring now to FIG. 2, the IPS 120 includes a CPU 204; RAM 208; ROM 212; a mass storage device 216, for example but not limited to an SSD drive; an I/O interface 220 to couple to, for example, display, keyboard/mouse or touchscreen, or the like; and a network interface module 224 to connect, either wirelessly or via a wired connection, to outside of the TDS 100. All of these modules are in communication with each other through a bus 228. The CPU 204 executes an operating system to operate and communicate with these various components as well as being programmed to implement aspects of the present disclosure as described herein.

Figure 3:
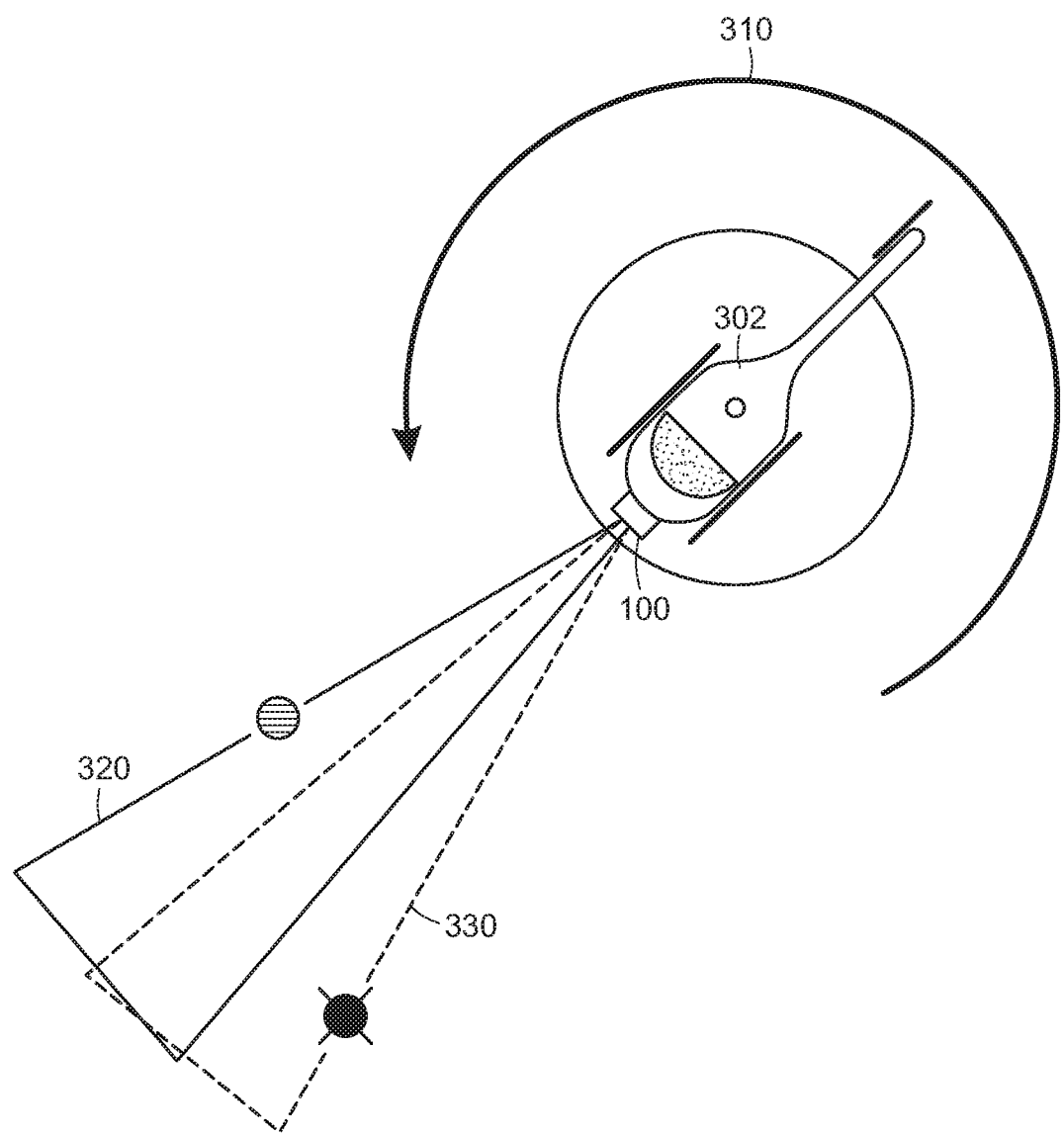
FIG. 3 is an implementation of the target detection system of FIG. 1.

As shown in FIG. 3, and in one aspect of the present disclosure, the TDS 100 is mounted on an airborne vehicle 302, for example, but not limited to, a helicopter. As is known, the helicopter 302 may hover and rotate, as identified by arrow 310 and, of course, can move up or down and laterally while hovering or moving. It should be understood that aspects of the present disclosure are not limited to placing the TDS 100 on just an aircraft but are just as applicable to ground-based or water-based vehicles with minor modifications well within the capabilities of one of ordinary skill in the art.

Preliminarily, aspects of the present disclosure are directed to methods and systems for identifying a target object in acquired images, representative of a target of a specific known type. In addition, the specific known type of target can be considered a black body source that has a set of known properties including, but not limited to, a maximum velocity at which the known type of target can travel; a first band of radiated energy that is emitted by the known type of target; a second band of radiated energy that is emitted by the known type of target where the first and second bands do not overlap and a characteristic ratio of the respective intensities of the signals in the first and second bands of radiated energy. In one aspect of the present disclosure, each of the first and second bands is in one of: the mid-wave band of the infrared (IR) spectrum; or the long-wave band of the IR spectrum. Implementations of the present disclosure, however, can also acquire images in the short-wave band of the IR spectrum or in different colors in the visible light band.

Figure 4:
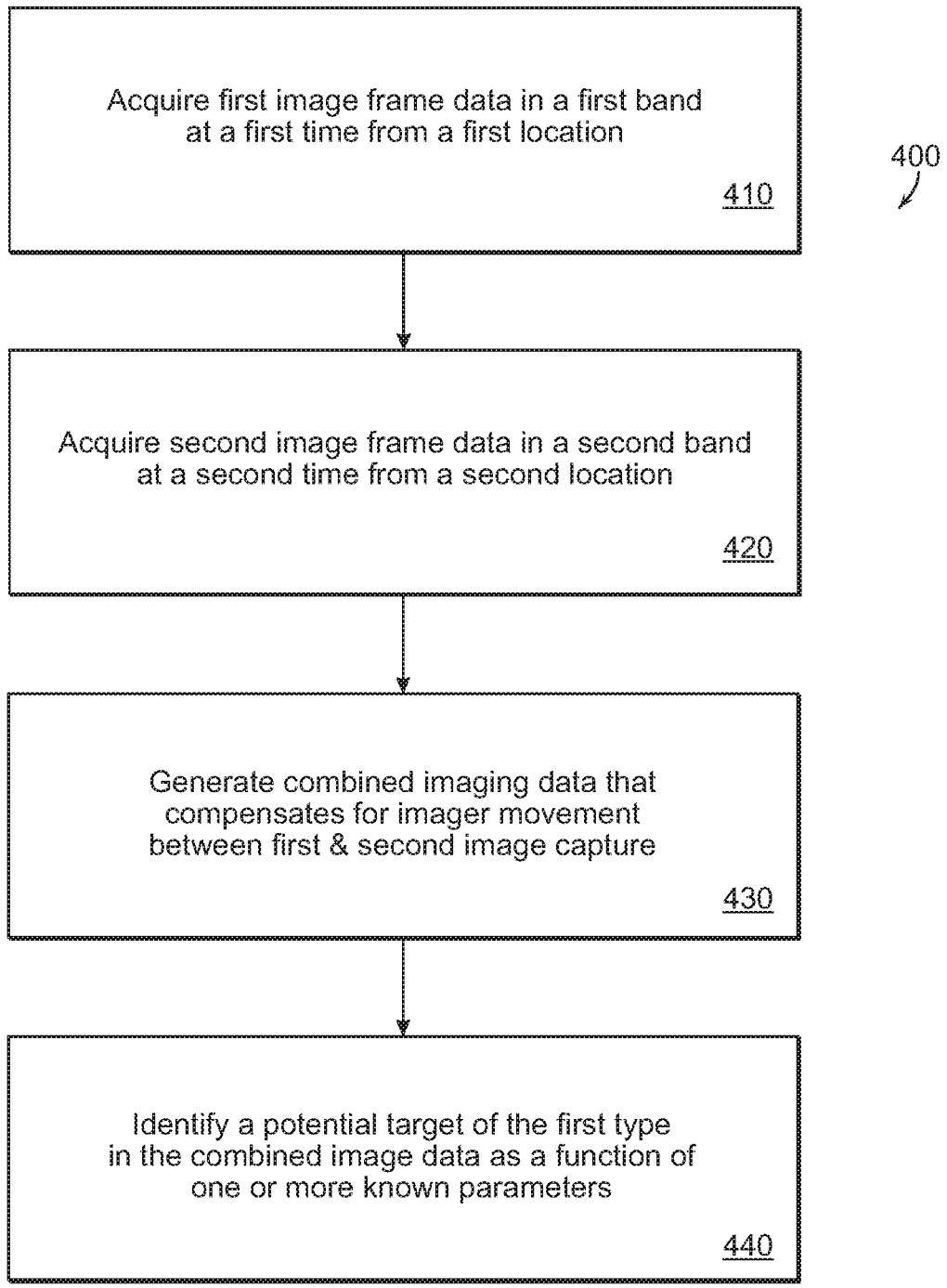
FIG. 4 is a method of target detection in accordance with an aspect of the present disclosure.
Figure 5:
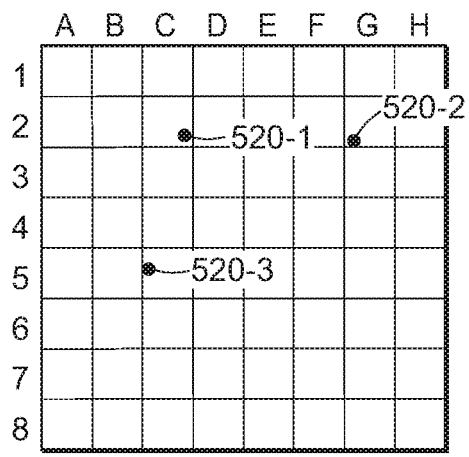
FIG. 5 is a representation of first image frame data acquired in accordance with an aspect of the present disclosure.

A method 400 of detecting a first type of target in accordance with an aspect of the present disclosure is presented in FIG. 4. In a step 410, the imager 110, which can be, for non-limiting explanatory purposes, a single focal plane, channel-sequential multispectral imager, acquires in a first band 320, as shown in FIG. 3, first image frame data 510, as shown in FIG. 5. The first image frame data 510 is captured at a first image capture time, at a first location as determined by the INS 115, where the first image frame data 510 comprises at least one first image object 520.

Figure 6:
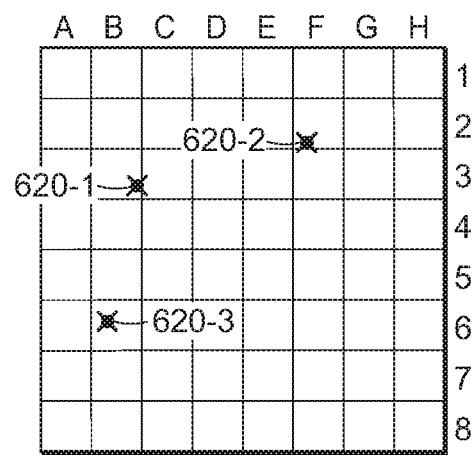
FIG. 6 is a representation of second image frame data acquired in accordance with an aspect of the present disclosure.

Subsequently, in a step 420, the imager 110 acquires in a second band 330, as shown in FIG. 3, second image frame data 610, as shown in FIG. 6. The second image frame data 610 is captured at a second image capture time, subsequent to the first image capture time, and at a second location as determined by the INS 115, where the second image frame data 610 comprises at least one second image object 620.

Figure 7:
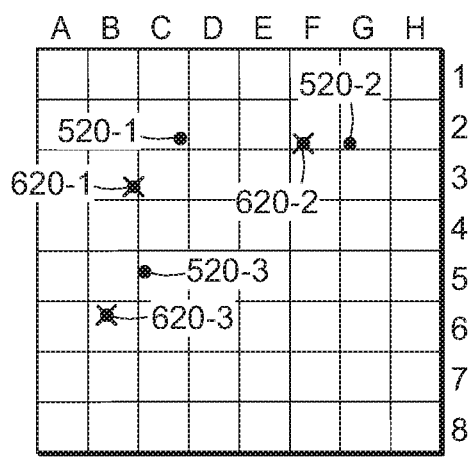
FIG. 7 is a representation of an offset between the first image frame data of FIG. 5 and the second image frame data of FIG. 6.

Referring to FIG. 3, it is noted that the two captured bands 320, 330 are offset from one another. This is due to the motion of the helicopter 302 in the time between the acquisition of the two images. Accordingly, when the first image frame data 510 and the second image frame data 610 are superimposed over one another in a frame 710, as shown in FIG. 7, there is an offset of the first and second image objects 520, 620. This is disadvantageous, as it may be the case that pairs of first and second image frame objects 520, 620 are actually representative of a same potential target of interest but, because of the offset, appear as being separate objects.

Figure 8:
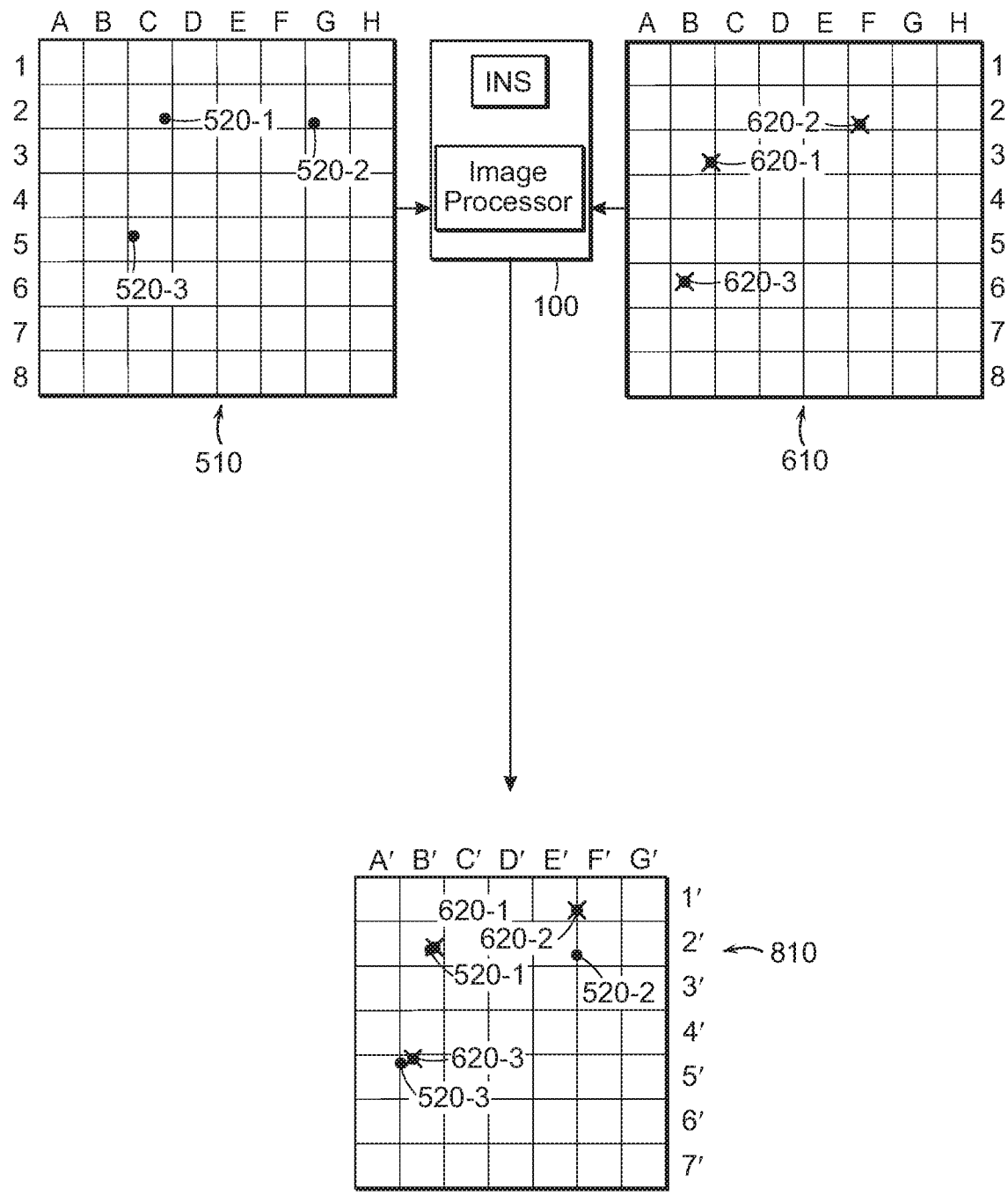
FIG. 8 is a representation of the method of FIG. 4 is applied to the first and second age image frame data of FIGS. 5 and 6 in accordance with an aspect of the present disclosure.
Figure 9:
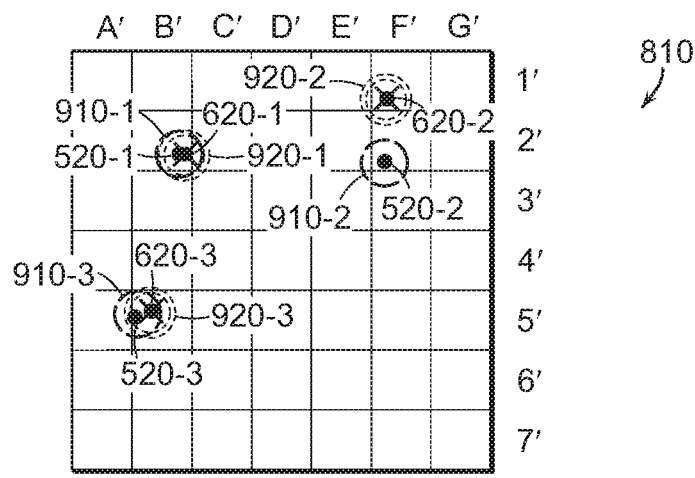
FIG. 9 represents a portion of the method represented in FIG. 4.

Accordingly, in a next step 430, combined image frame data is generated from the first and second image frame data 510, 610 by compensating for imager movement between the first and second image capture times as a function of the first and second location data. As shown in FIG. 8, conceptually, the first image frame data 510 and the second image frame data 610 are processed by the TDS 100 into a common reference frame 810 that correlates the first and second image objects 520, 620. Thus, for example, the first image object 520-1 in location (710:C,2) and the second image object 620-1 in location (710:B,3) are now in location (810:B',2') and there is a possibility that they represent a target of interest. Similarly, this correlation processing is repeated for the other objects 520-2, 520-3 and 620-2, 620-3, i.e., for as many potential objects as are present. There are many approaches to creating a reference frame as known to those of ordinary skill in the art. In addition, compensation for image distortion may be implemented but is well known and need not be described herein.

Next, step 440, a potential target of the first type is identified from the combined imaging data 810 as a function of the one or more known properties, i.e., the set of known properties. The identification of the potential target, in accordance with an aspect of the present disclosure, includes defining a respective first travel radius 910 for each first image object 520 (i.e., each first image object 520-1, 520-2, 520-3 has its own first travel radius 910-1, 910-2, 910-3) and a respective second travel radius 920 for each second image object 620 (i.e., each second image object 620-1, 620-2, 620-3 has its own second travel radius 920-1, 920-2, 920-3) in the combined image frame data 810. Each travel radius 910, 920 can be determined as a function of the first and second image capture times, the first and second location data, the maximum velocity value, and a target recognition sensitivity metric to reduce "false positive," discussed in more detail below. In other words, the first and second travel radii 910, 920 represent how far a respective first and second image object 520, 620 could have traveled in pixel space during the time between frames.

Further, each travel radius 910, 920 can be determined as a function of one or more additional parameters that may be inferred, defined or measured. One such additional parameter is a range, i.e., a distance, from the imager to the target, corresponding to the image object when the image frame is captured. There are many known ways to infer range such as luminous intensity and apparent size. Alternatively, the information may be obtained from a secondary measurement source such as radar or LIDAR. A range measurement can be used to bound travel radii but one of ordinary skill in the art will understand that there are different methodologies to determine range and aspects of the present disclosure are not limited to a specific approach of measuring range.

Once the first and second travel radii 910, 920 are defined, those pairs of first and second image objects with intersecting travel radii are identified. Those image objects with radii that do not intersect are not likely to be targets of interest and can be ignored, at least when looking for the current type of target of interest.

Figure 10:
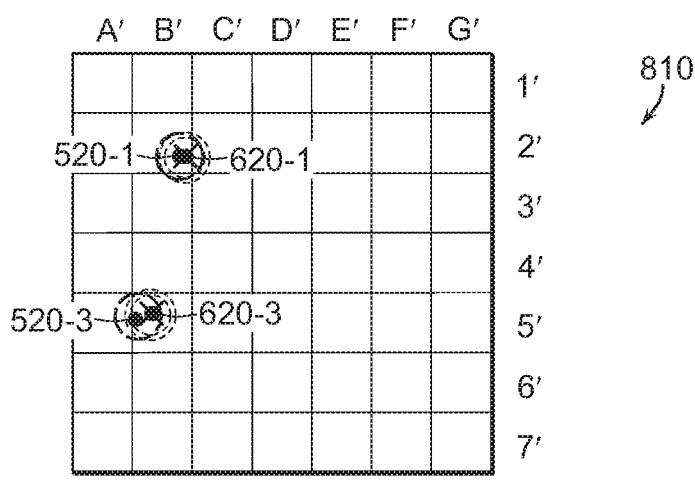
FIG. 10 represents a portion of the method represented in FIG. 4.

Accordingly, referring now to FIG. 10, the first and second objects 520-2, 620-2 have been removed from consideration as the radii did not encircle at least one other target in the other frame. In other words, it is not likely that they represent one of the same targets of interest in the other frame as none of the targets of interest could have traveled beyond that bounding distance in the time between the image frames being collected. The others shown in FIG. 10 are possible targets of interest.

Figure 11:
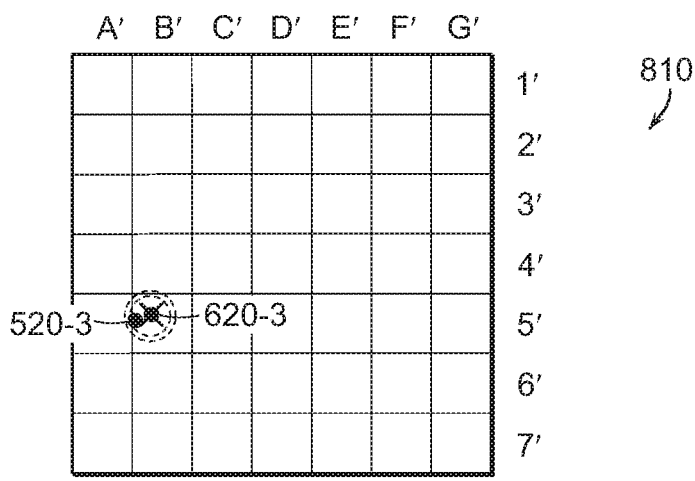
FIG. 11 represents a portion of the method represented in FIG. 4.

To reduce the "false positives" or to set a CFAR (Constant False Alarm Rate), the remaining pairs of objects (i.e., 520-1, 620-1 and 520-3, 620-3) are subjected to an additional filtering test as a function of an intensity value R that is recorded for each image object. In accordance with an aspect of the present disclosure, therefore, for each identified pair of first and second image objects 520, 620 that remain in FIG. 10, i.e., those with intersecting travel radii: a ratio (R1:R2) of an intensity value R1 of the first image object 520 to an intensity value R2 of the second object image 620 is generated. If the ratio R1:R2 is within a predetermined range of values, the respective pair of first and second image objects 520, 620 is identified as representative of a target of the first type and may warrant further investigation via other mechanisms not germane to aspects of the present disclosure. Referring to FIG. 11, therefore, only the pair of first and second image objects (520-3, 620-3) meets the ratio criteria as representing a target that warrants further investigation by other systems.

Various embodiments of the above-described systems and methods may be implemented in digital electronic circuitry, in computer hardware, firmware, and/or software. The implementation can be as a computer program product, i.e., a computer program embodied in a tangible information carrier. The implementation can, for example, be in a machine-readable storage device to control the operation of data processing apparatus. The implementation can, for example, be a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described embodiments generally depict a computer implemented system employing at least one processor executing program steps out of at least one memory to obtain the functions herein described, it should be recognized that the presently-described methods may be implemented via the use of software, firmware or alternatively, implemented as a dedicated hardware solution such as in a field programmable gate array (FPGA) or an application specific integrated circuit (ASIC) or via any other custom hardware implementation. Further, various functions, functionalities and/or operations may be described as being performed by or caused by software program code to simplify description or to provide an example. However, those skilled in the art will recognize what is meant by such expressions is that the functions result from execution of the program code/instructions by a computing device as described above, e.g., including a processor, such as a microprocessor, microcontroller, logic circuit or the like.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CD-ROM or any other optical medium, punched cards, paper tape, or any other physical or paper medium, a RAM, a PROM, and EPROM, a FLASH-EPROM, or any other memory chip or cartridge, or any other non-transitory medium from which a computer can read. From a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

It is to be understood that aspects of the present disclosure have been described using non-limiting detailed descriptions of embodiments thereof that are provided by way of example only and are not intended to limit the scope of the disclosure. Features and/or steps described with respect to one embodiment may be used with other embodiments and not all embodiments have all of the features and/or steps shown in a particular figure or described with respect to one of the embodiments. Variations of embodiments described will occur to persons of skill in the art.

It should be noted that some of the above described embodiments include structure, acts or details of structures and acts that may not be essential but are described as examples. Structure and/or acts described herein are replaceable by equivalents that perform the same function, even if the structure or acts are different, as known in the art, e.g., the use of multiple dedicated devices to carry out at least some of the functions described as being carried out by the processor. Therefore, the scope of the present disclosure is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of detecting a first type of target having a corresponding set of known properties, comprising:
   capturing, with an imager, a first image frame that includes first image frame data at a first image capture time, where the first image frame comprises at least one first image object;
   obtaining, with an inertial navigation system associated with the imager, first location data identifying a first location of the imager at the first image capture time;
   capturing, with the imager, a second image frame that includes second image frame data at a second image capture time subsequent to the first image capture time, where the second image frame comprises at least one second image object;
   obtaining, with the inertial navigation system, second location data identifying a second location of the imager at the second image capture time;
   generating combined image frame data from the first and second image frame data by compensating for imager movement between the first and second image capture times as a function of the first and second location data; and
   identifying a target of the first type in the combined image frame data as a function of the set of known properties, wherein the set of known properties comprises:
   a maximum velocity at which the first type of target can travel;
   a first band of radiated energy that is emitted by the first type of target;
   a second band of radiated energy that is emitted by the first type of target, and that does not overlap with the first band of radiated energy; and
   a characteristic ratio of the respective intensities of signals in the first and second bands of radiated energy, where the characteristic ratio is in a predetermined range of values.

2. The method of claim 1, wherein the imager is a single focal plane, channel-sequential multispectral imager, the method further comprising:
   capturing the first image frame data in the first band of radiated energy; and capturing the second image frame data in the second band of radiated energy.

3. The method of claim 2, wherein identifying a target of the first type in the combined image frame data further comprises:
defining a respective travel radius for each first and second image object in the combined image frame data as a function of the first and second image capture times, the first and second location data and the maximum velocity value;
identifying each pair of first and second image objects with intersecting travel radii; and
for each identified pair of first and second image objects with intersecting travel radii:
generating a ratio (R1:R2) of an intensity value R1 of the first image object to an intensity value R2 of the second object image; and
if the generated ratio is within a predetermined range of values, identifying the respective pair of first and second image objects as representative of a target of the first type.

4. The method of claim 3, wherein compensating for imager motion between the first and second image capture times further comprises:
combining the first and second images into a common reference frame as a function of the first image capture time, the first location data, the second image capture time and the second location data.

5. The method of claim 1, wherein:
each of the first and second bands is in one of:
the mid-wave band of the infrared (IR) spectrum;
the long-wave band of the IR spectrum;
the short-wave band of the IR spectrum; or
the band of the visible light spectrum.

6. The method of claim 3, wherein defining the respective travel radius for each first and second image object further comprises:
determining a corresponding distance from the imager to each of the first and second objects in the first and second image frames when captured by the imager; and
defining the respective travel radius for each first and second image object in the combined image frame data as a function of the corresponding distance from the imager to each of the first and second objects in the first and second image frames when captured by the imager.

7. A target detection system for detecting a first type of target having a corresponding set of known properties, comprising:
an imager configured to capture a first image frame including first image frame data at a first image capture time, where the first image frame comprises at least one first image object and configured to capture a second image frame including second image frame data at a second image capture time subsequent to the first image capture time, where the second image frame comprises at least one second image object;
an inertial navigation system coupled to the imager and configured to provide first location data identifying a first location of the imager at the first image capture time and configured to provide second location data identifying a second location of the imager at the second image capture time;
an image processor coupled to the imager and the inertial navigation system and configured to:
generate combined image frame data from the first and second image frame data by compensating for imager movement between the first and second image capture times as a function of the first and second location data; and
identify a target of the first type in the combined image frame data as a function of the set of known properties, wherein the set of known properties comprises:
a maximum velocity at which the first type of target can travel;
a first band of radiated energy that is emitted by the first type of target a second band of radiated energy that is emitted by the first type of target, and that does not overlap with the first band of radiated energy; and
a characteristic ratio of the respective intensities of signals in the first and second bands of radiated energy, where the characteristic ratio is in a predetermined range of values.

8. The target detection system of claim 7, wherein the imager is a single focal plane, channel-sequential multispectral imager, and wherein:
the imager is further configured to capture the first image frame data in the first band of radiated energy; and
the imager is further configured to capture the second image frame data in the second band of radiated energy.

9. The target detection system of claim 8, wherein the image processor is further configured to identify a target of the first type in the combined image frame data by:
defining a respective travel radius for each first and second image object in the combined image frame data as a function of the first and second image capture times, the first and second location data and the maximum velocity value;
identifying each pair of first and second image objects with intersecting travel radii; and
for each identified pair of first and second image objects with intersecting travel radii:
generating a ratio (R1:R2) of an intensity value R1 of the first image object to an intensity value R2 of the second object image; and
if the generated ratio is within a predetermined range of values, identifying the respective pair of first and second image objects as representative of a target of the first type.

10. The target detection system of claim 9, wherein the image processor is further configured to compensate for imager motion between the first and second image capture times by:
combining the first and second images into a common reference frame as a function of the first image capture time, the first location data, the second image capture time and the second location data.

11. The target detection system of claim 7, wherein:
each of the first and second bands is in one of:
the mid-wave band of the infrared (IR) spectrum;
the long-wave band of the IR spectrum;
the short-wave band of the IR spectrum; or
the band of the visible light spectrum.

12. The target detection system of claim 9, wherein the image processor is further configured to:
determine a corresponding distance from the imager to each of the first and second objects in the first and second image frames when captured by the imager; and
define the respective travel radius for each first and second image object in the combined image frame data as a function of the corresponding distance from the imager to each of the first and second objects in the first and second image frames when captured by the imager.

13. A non-transitory tangible computer-readable medium storing instructions thereon that, when executed by an image processor within a system comprising the image processor, an imager and an inertial navigation system, causes the image processor to implement a method of detecting a first type of target having a corresponding set of known properties, the method comprising:
- receiving, from the imager, first image frame data from a first image frame captured at a first image capture time, where the first image frame comprises at least one first image object;
- receiving, from the imager, second image frame data from a second image frame captured at a second image capture time subsequent to the first image capture time, where the second image frame comprises at least one second image object;
- receiving, from the inertial navigation system, first location data identifying a first location of the imager at the first image capture time and second location of the imager at the second image capture time;
- generating combined image frame data from the first and second image frame data by compensating for imager movement between the first and second image capture times as a function of the first and second location data; and
- identifying a target of the first type in the combined image frame data as a function of the set of known properties, wherein the set of known properties comprises:
- a maximum velocity at which the first type of target can travel;
- a first band of radiated energy that is emitted by the first type of target;
- a second band of radiated energy that is emitted by the first type of target, and that does not overlap with the first band of radiated energy; and
- a characteristic ratio of the respective intensities of signals in the first and second bands of radiated energy, where the characteristic ratio is in a predetermined range of values.

14. The non-transitory tangible computer-readable medium of claim 13, wherein:
- the first image frame data is in the first band of radiated energy; and
- the second image frame data is in the second band of radiated energy.

15. The non-transitory tangible computer-readable medium of claim 14, wherein identifying a target of the first type in the combined image frame data further comprises:
- defining a respective travel radius for each first and second image object in the combined image frame data as a function of the first and second image capture times, the first and second location data and the maximum velocity value;
- identifying each pair of first and second image objects with intersecting travel radii; and
- for each identified pair of first and second image objects with intersecting travel radii:
    - generating a ratio (R1:R2) of an intensity value R1 of the first image object to an intensity value R2 of the second object image; and
    - if the generated ratio is within a predetermined range of values, identifying the respective pair of first and second image objects as representative of a target of the first type.

16. The non-transitory tangible computer-readable medium of claim 15, wherein compensating for imager motion between the first and second image capture times further comprises:
- combining the first and second images into a common reference frame as a function of the first image capture time, the first location data, the second image capture time and the second location data.

17. The non-transitory tangible computer-readable medium of claim 15, wherein defining the respective travel radius for each first and second image object further comprises:
- determining a corresponding distance from the imager to each of the first and second objects in the first and second image frames when captured by the imager; and
- defining the respective travel radius for each first and second image object in the combined image frame data as a function of the corresponding distance from the imager to each of the first and second objects in the first and second image frames when captured by the imager.

* * * * *